United States Patent
Sugaya et al.

(10) Patent No.: US 7,253,568 B2
(45) Date of Patent: Aug. 7, 2007

(54) HIGH PRESSURE DISCHARGE LAMP LIGHTING APPARATUS

(75) Inventors: Katumi Sugaya, Hyogo (JP); Tsuyoshi Sugihara, Hyogo (JP); Yoshikazu Suzuki, Kanagawa (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 94 days.

(21) Appl. No.: 11/167,116

(22) Filed: Jun. 28, 2005

(65) Prior Publication Data
US 2005/0285535 A1    Dec. 29, 2005

(30) Foreign Application Priority Data
Jun. 28, 2004 (JP) ............................. 2004-189784
Jul. 12, 2004 (JP) ............................. 2004-204506

(51) Int. Cl.
H01B 37/02 (2006.01)
H01J 17/20 (2006.01)

(52) U.S. Cl. ................. 315/291; 315/307; 313/639; 313/642; 313/571

(58) Field of Classification Search ............. 315/59, 315/291, 307
See application file for complete search history.

(56) References Cited

U.S. PATENT DOCUMENTS

| | | | |
|---|---|---|---|
| 4,792,727 A * | 12/1988 | Godyak | ................. 315/176 |
| 5,109,181 A | 4/1992 | Fischer et al. | |
| 5,497,049 A | 3/1996 | Fischer | |
| 6,184,633 B1 * | 2/2001 | Kramer | ................. 315/246 |
| 6,717,375 B2 * | 4/2004 | Noguchi et al. | ............ 315/291 |
| 2002/0021097 A1 * | 2/2002 | Ito et al. | ................. 315/291 |
| 2003/0080693 A1 * | 5/2003 | Ono et al. | .................. 315/224 |
| 2004/0217705 A1 * | 11/2004 | Takahashi | ................... 313/574 |
| 2007/0024207 A1 * | 2/2007 | Harada et al. | .............. 315/246 |

FOREIGN PATENT DOCUMENTS

JP    2001313191 A  *  11/2001

* cited by examiner

*Primary Examiner*—Trinh Vo Dinh
(74) *Attorney, Agent, or Firm*—Rader, Fishman & Grauer PLLC (57) ABSTRACT

It is an object of the present invention to provide a high pressure discharge lamp lighting apparatus, has a structure to control decrease of illuminance on a screen which is thought to be a cause of wear of an anode in an early stage of the life span. The high pressure discharge lamp lighting apparatus has a high pressure discharge lamp in which a pair of electrodes is arranged so as to face each other at an interval of 2 mm or less in an arc tube which is made of quartz glass, and mercury of 0.16 mg/mm$^3$ or more, rare gas, and halogen of $1\times10^{-6}$ to $1\times10^{-2}$ μmol/mm$^3$ is enclosed, and a power supply apparatus supplying direct current to the discharge lamp, wherein the power supply apparatus superimposes an alternating component on the direct current and impress the superimposed current to the discharge lamp.

6 Claims, 7 Drawing Sheets

| Supper Imposed Waveform | Frequency | Super Imposition Ratio | Presence of Projection |
|---|---|---|---|
| Non | - | 0 | x |
| Sine Wave | 20 | 0.03 | x |
| Sine Wave | 20 | 0.05 | △ |
| Sine Wave | 20 | 0.10 | O |
| Sine Wave | 20 | 0.20 | O |
| Sine Wave | 40 | 0.03 | x |
| Sine Wave | 40 | 0.05 | △ |
| Sine Wave | 40 | 0.10 | O |
| Sine Wave | 40 | 0.20 | O |
| Sine Wave | 100 | 0.03 | x |
| Sine Wave | 100 | 0.05 | △ |
| Sine Wave | 100 | 0.20 | O |
| Sine Wave | 100 | 0.30 | O |
| Sine Wave | 100 | 0.40 | O |
| Sine Wave | 500 | 0.03 | x |
| Sine Wave | 500 | 0.05 | △ |
| Sine Wave | 500 | 0.50 | O |
| Sine Wave | 500 | 1.00 | O |
| Sine Wave | 500 | 2.00 | O |
| Sine Wave | 1000 | 0.03 | x |
| Sine Wave | 1000 | 0.05 | △ |
| Sine Wave | 1000 | 0.50 | O |
| Sine Wave | 1000 | 1.00 | O |
| Sine Wave | 1000 | 2.00 | O |
| Sine Wave | 5000 | 0.03 | x |
| Sine Wave | 5000 | 0.05 | △ |
| Sine Wave | 5000 | 0.50 | O |
| Sine Wave | 5000 | 1.00 | O |
| Sine Wave | 5000 | 2.00 | O |
| Sine Wave | 10000 | 0.03 | x |
| Sine Wave | 10000 | 0.05 | x |
| Sine Wave | 10000 | 0.50 | x |
| Sine Wave | 10000 | 1.00 | x |
| Sine Wave | 10000 | 2.00 | x |

FIG. 7A

FIG. 7B

HIGH PRESSURE DISCHARGE LAMP LIGHTING APPARATUS

FIELD OF THE INVENTION

The present invention relates to a high pressure discharge lamp lighting apparatus.

DESCRIPTION OF THE RELATED ART

Specifically, it relates a lighting apparatus used for a projector apparatus, such as a DLP (digital light processor) using a liquid crystal display apparatus or a DMD (digital mirror device) in which as a light source, a high-pressure mercury lamp in which mercury of 0.16 mg/mm$^3$ or more is enclosed in an arc tube, and the mercury vapor pressure thereof at time of lighting is 110 or more atmospheric pressure.

A projection type projector apparatus is required to uniformly illuminate an image with sufficient color rendering properties on a rectangle-shaped screen, and for a light source, a metal halide lamp in which mercury or metal halide is enclosed, is used. Moreover, in recent years, miniaturization of such a metal halide lamp is further advancing, and the lamp used as a point light source is being developed. Further, the metal halogen lamp in which a distance between electrodes is short, is put in practical use.

In recent years, in view of the background, a lamp with high mercury vapor pressure, such as 150 atmospheric pressure, which had never been developed, is proposed in place of such a metal halide lamp. In such a lamp, by making the mercury vapor pressure higher, light output is further improved while a spread of an arc is controlled (narrowed). Such an extra-high pressure discharge lamp is disclosed in, for example, Japanese Laid Open Patent Nos. 2-148561 and 6-52830.

As such a lamp, an extra-high pressure mercury lamp, is used, wherein, for example, a pair of electrodes is arranged so as to face each other at an interval of 2 mm or less in an arc tube which is made of quartz glass, and mercury of 0.16 mg/mm$^3$ or more and halogen of $1\times10^{-6}$ to $1\times10^{-2}$ μmol/mm$^3$ is enclosed. Although the primary purpose of enclosing halogen therein is to prevent devitrification of the arc tube, this also produces so-called halogen cycle.

The above-mentioned high-pressure mercury lamp (hereinafter also merely referred to as a discharge lamp) with such features can be classified into two groups, a direct-current lighting system and an alternate-current lighting system according to a lighting method thereof. In the alternate-current lighting system, since two electrodes which face each other are designed so as to be almost the same in size, so that each electrode receives almost the same thermal load, and since polarity changes periodically, a luminescent spot is formed at the tip of each electrode.

On the other hand, in the direct-current lighting system, an electrode used as an anode is designed so as to be large in size in consideration of the thermal load due to electron collision, as compared with an electrode used as cathode, and a luminescent spot is formed only at the tip of a cathode. The features, in which at the tip of only one of these electrodes the luminescent spot is formed, are advantageous when light is condensed to an optical device such as a liquid crystal device and a DMD, that is optically small in size.

However, in the direct-current lighting system, only an anode is heated thereby causing wear thereof. In particular, in such a light source for a projector, since a constant electric power control system is used, when a distance between the electrodes is short at the beginning of the life span of the system, lamp voltage is the lowest in the life, and since large current flows, the wear of the tip of the anode is remarkable. The wear of the anode means the growth of the arc length, and as a result, a screen illuminance falls remarkably in the early stage of the life-span.

BRIEF SUMMARY OF THE INVENTION

In view of the above-mentioned problems, It is an object of the present invention to provide a direct current lighting type of high pressure discharge lamp apparatus, actively using a luminescent spot of a cathode, in which decrease of screen illuminance at an initial stage of the life span which is thought to be a cause of wear of an anode is controlled.

The object of the invention is achieved by a high pressure discharge lamp lighting apparatus having a high pressure discharge lamp in which a pair of electrodes is arranged so as to face each other at an interval of 2 mm or less in an arc tube which is made of quartz glass, and mercury of 0.16 mg/mm$^3$ or more, rare gas, and halogen of $1\times10^{-6}$ to $1\times10^{-2}$ μmol/mm$^3$ is enclosed, and a power supply apparatus supplying direct current to the discharge lamp, wherein the power supply apparatus superimposes an alternating current component on the direct current and impress the superimposed current to the discharge lamp.

A frequency of the alternating current component may be 40 to 5000 Hz, and $0.05 \leq (\text{Imax} - \text{Imin})/\text{IDC} \leq 2$ wherein Imax represents a maximum current value, Imin represents a minimum current value and IDC represents direct current value.

The frequency may be in a range of 100-2000 Hz.

In the high pressure discharge lamp lighting apparatus, a waveform of an alternating current component may be symmetric in upward and downward directions with respect to the direct current which turns into a base value.

The waveform may be sine waveform.

The waveform may be approximately triangle waveform.

The objects are also accomplished by a power supply apparatus for a high pressure discharge lamp lighting apparatus having a high pressure discharge lamp in which a pair of electrodes is arranged so as to face each other in an arc tube, and mercury of 0.16 mg/mm$^3$ or more, rare gas, and halogen of $1\times10^{-6}$ to $1\times10^{-2}$ μmol/mm$^3$ is enclosed, wherein the power supply apparatus supplies direct current to the discharge lamp, and superimposes an alternating current component on the direct current and impress the superimposed current to the discharge lamp.

Furthermore, the objects are accomplished by a method of forming a projection at a tip of an anode of a high pressure discharge lamp in which a pair of electrodes is arranged so as to face each other in an arc tube, and mercury of 0.16 mg/mm$^3$ or more, rare gas, and halogen of $1\times10^{-6}$ to $1\times10^{-2}$ μmol/mm$^3$ is enclosed, comprising the following steps of superimposing an alternating current component on direct current and impressing the superimposed current to the discharge lamp.

Thus, the present invention possesses a number of advantages or purposes, and there is no requirement that every claim directed to that invention be limited to encompass all of them.

In addition, the foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Description of the present invention be given, referring to Embodiments. While the present invention is not necessarily limited to such embodiments, an appreciation of various aspects of the invention is best gained through a discussion of various examples in such an application.

In the above-mentioned structure according to the invention, by superimposing an alternating current component on a direct current value, it is possible to form a projection at the tip of the anode, whereby it is possible to compensate increase of a distance between the electrodes due to wear of the anode, so that the distance between the electrodes can be maintained to be approximately constant and illuminance on the screen can be maintained to be constant.

Figure 1:
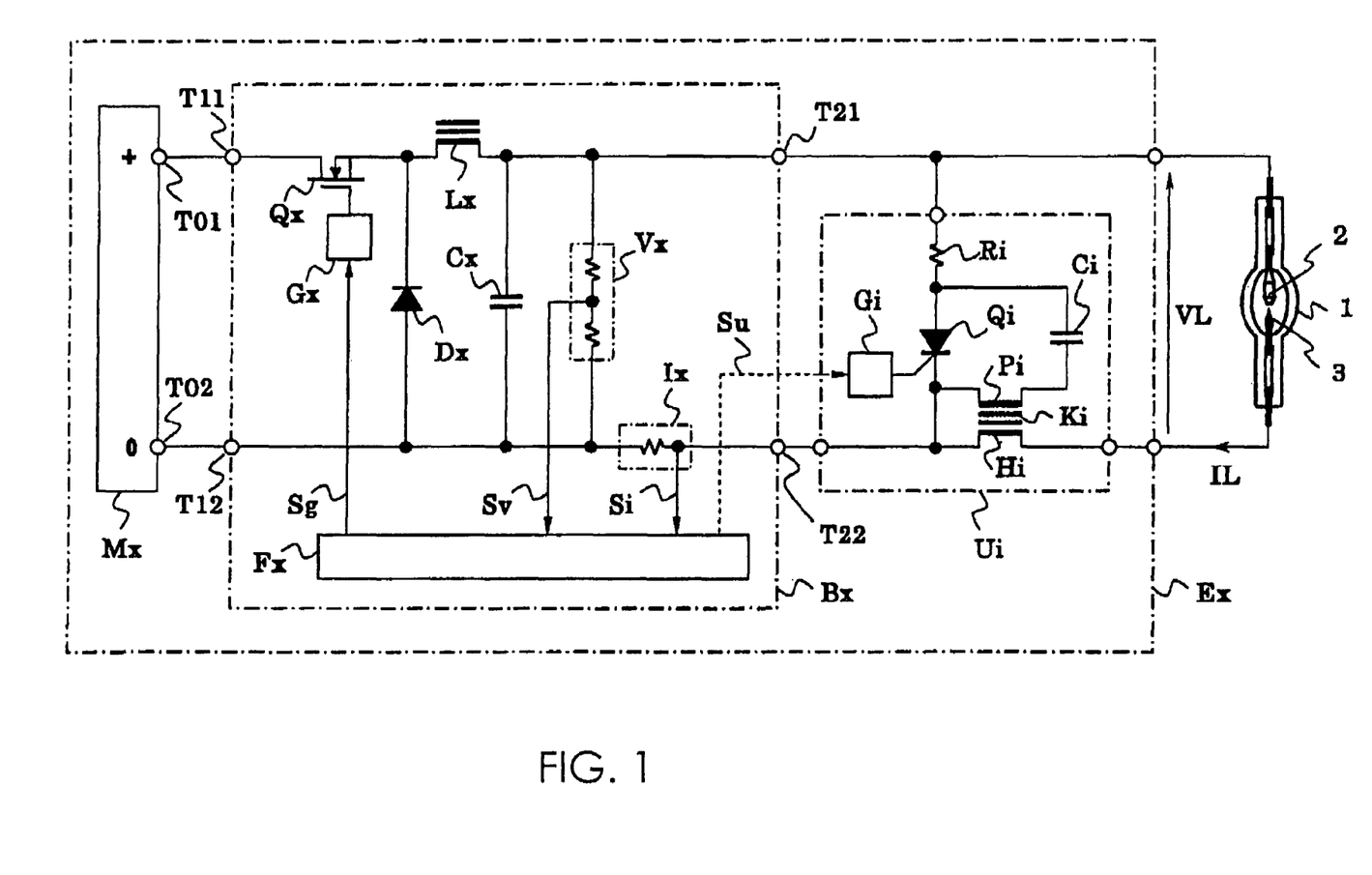
FIG. 1 shows a power supply apparatus according to the present invention.

FIG. 1 shows a high pressure discharge lamp according to the present invention.

In a power supply apparatus (Ex), a step down chopper type ballast circuit (Bx) is operated by voltage supplied from a DC power source (Mx) such as PFC etc. In the ballast circuit (Bx), current from the DC power source (Mx) is turned on and off by a switching device (Qx) such as an FET etc. and a smoothing condenser (Cx) is charged through a choke coil (Lx). This voltage is impressed to a discharge lamp 1 so that current flows in the discharge lamp 1.

While the switching element (Qx) is on, direct charge to the smoothing condenser (Cx) and current supply to the discharge lamp 1 is carried out by current flowing through the switching element (Qx), and at the same time, energy is accumulated in the choke coil (Lx) in form of current. While the switching element (Qx) is off, charge to the smoothing condenser (Cx) through a flywheel diode (Dx) and current supply to the discharge lamp (Ld) is carried out by the energy in form of current, which has been accumulated in the choke coil (Lx).

In a starter (Ui), a capacitor (Ci) is charged through a resistor (Ri) by lamp voltage (VL). When a gate drive circuit (Gi) is activated, a switching element (Qi) comprising a thyristor etc. becomes conductive so that the charges accumulated in the condenser (Ci) is discharged through a primary winding (Pi) of a transformer (Ki), and a high voltage pulse is generated on a secondary winding (Hi). The high voltage generated on the secondary winding (Hi) of the starter (Ui) is overlaid on output voltage of the ballast circuit (Bx) and impressed between electrodes (2, 3) so that discharge of the discharge lamp can be initiated.

The power supply controlling unit (Fx) generates a gate drive signal (Sg) having a certain duty cycle ratio. The gate drive signal (Sg) is applied to a gate terminal of the switch element (Qx) through the gate drive circuit (Gx) thereby controlling the current from the DC power source (Mx) to be turned off and on.

Lamp current (IL) flowing between the electrodes (2, 3) and the lamp voltage (VL) generated between the electrodes (2, 3) are detected by and a current detecting unit (Ix) and a voltage detecting unit (Vx), respectively. A shunt resistor (s) is used for the current detecting unit (Ix) and voltage dividing resistor(s) are used for the voltage detecting unit (Vx) thereby easily making up them.

A lamp current signal (Si) outputted from the current detecting unit (Ix) and a lamp voltage signal (Sv) outputted from the voltage detecting unit (Vx) are inputted to the power supply controlling unit (Fx).

Based on a state of the discharge of the discharge lamp (Ld) at that time, that is, whether the state of discharge is non-discharge, whether it is glow discharge (in some instances, what kind of the glow discharge it is), or whether it is arc discharge (in some instances, what kind of the arc discharge it is), the duty cycle ratio of the gate drive signal (Sg) is controlled in a feed-back manner so as to reduce difference between a target value and the lamp current (IL), the lamp voltage (VL) or lamp power which is a product of the lamp current (IL) and the lamp voltage (VL).

Figure 2:
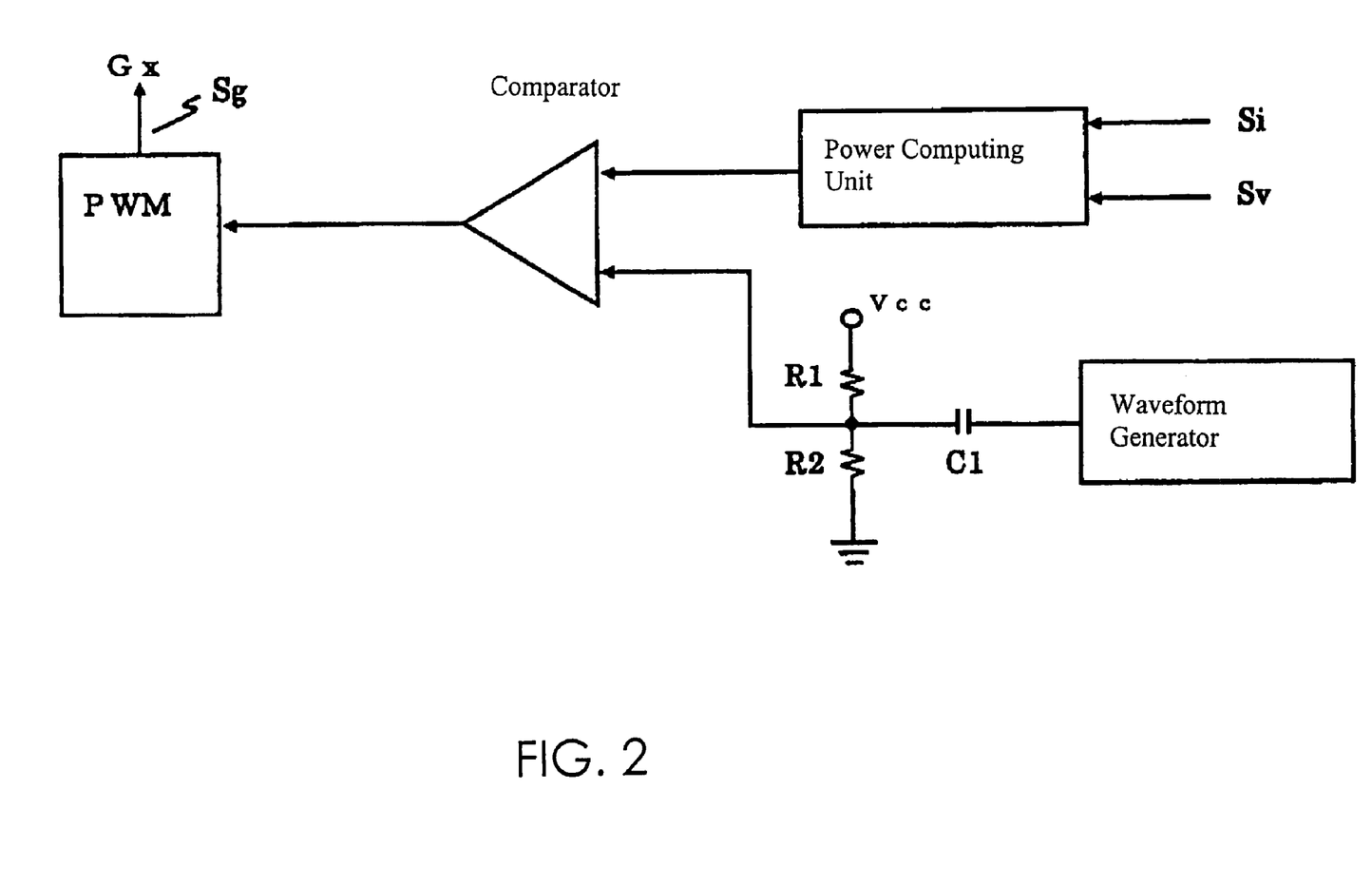
FIG. 2 shows a power supply apparatus according to the present invention.

FIG. 2 shows an internal structure of the power supply controlling circuit (Fx). The lamp current signal (Si) and the lamp voltage signal (Sv) are inputted to a power computing unit in order to calculate a lamp power value, and the lamp power value is inputted to an operational amplifier.

A sine wave generating circuit or a triangular wave generating circuit is built in a waveform generator, so as to output such a sine wave signal or a triangular wave signal and to superimpose the signal from the waveform generator on a value obtained by dividing the DC voltage Vcc outputted from a direct current power source, by resistors R1 and R2 through a capacitor C1 so as to input it to the other terminal of the operational amplifier.

This input signal turns into a reference signal for a power waveform in which an alternating current component is superimposed on direct current.

The operational amplifier compares inputted lamp power value with the reference signal, and controls the switching device (Qx) through a pulse width control circuit and a gate drive circuit (Gx) so as to match the lamp power value to the reference value.

Therefore, in order to adjust the direct-current power value which is a base value, DC power supply voltage Vcc is changed or the voltage dividing ratio of the resistors R1 and R2 is changed.

Moreover, the waveform generator is adjusted in order to adjust the alternating current component to be superimposed.

Figure 3A:
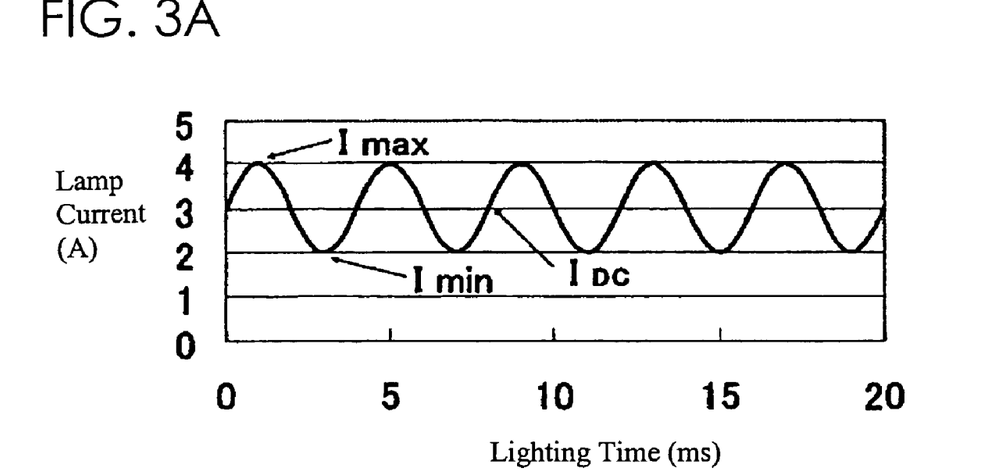
FIGS. 3A and 3B show current waveforms according to the present invention.
Figure 3B:
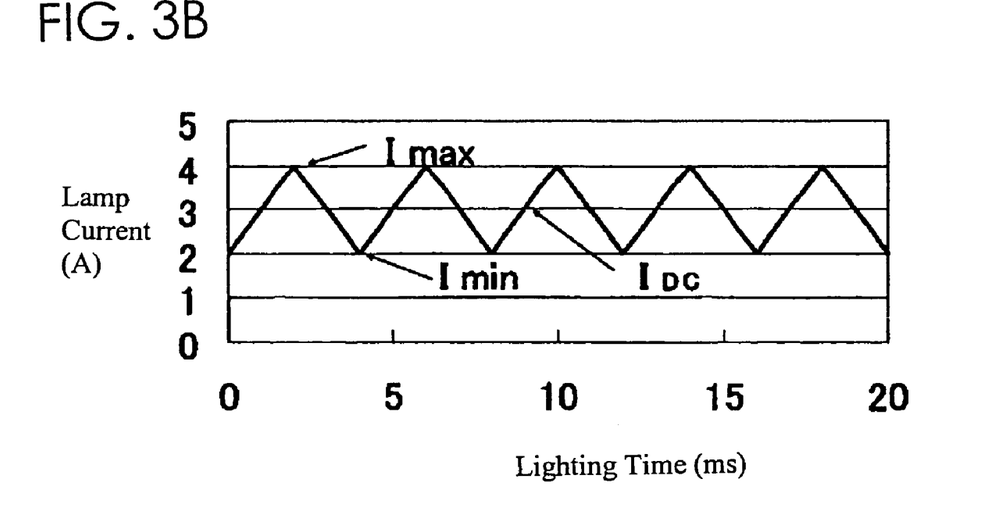

FIGS. 3A and 3B show the lamp current waveforms respectively which are supplied to the discharge lamp 1. FIG. 3A shows a case where the sine wave waveform is superimposed on the direct current value which turns into a base value, and FIG. 3B shows a case where a triangular-wave waveform is superimposed on the direct-current current value used as the base value.

A horizontal axis thereof represents time (microseconds), and a vertical axis thereof represents a lamp current value (Ampere).

In either case, a waveform having a maximum current value Imax and a minimum current value Imin is superimposed on the direct-current current value IDC used as the base value.

In the figure, the direct-current current value which serves as the base value is 3 A, a frequency of the alternating current component is 250 Hz, the maximum current value Imax is 4 A, and the minimum current value Imin is 2 A.

The frequency of the alternating current component needs to be selected in a range of 40-5000 Hz. If the frequency of the alternating current component becomes less than 40 Hz, change of the illuminance occurs thereby causing adverse affects on a screen. This is because the time interval between the maximum and minimum of a current value becomes longer, so that the change of light intensity occurs.

Moreover, if the frequency of the alternating current component exceeds 5000 Hz, the action capable of forming a projection at the tip of an anode is reduced. Therefore, the frequency of the alternating current component is selected from a range of 40-5000 Hz, preferably selected from a range of 100-2000 Hz.

An amplitude of the alternating current component is required to satisfy a condition of $0.05 \leq (Imax-Imin)/IDC \leq 2$ wherein IDC represents the maximum current Imax of the direct-current current value used as the base value Imax represents the maximum current value, and Imin represents the minimum current value. This is because temperature change which is a requisite for the projection formation and growth thereof occurs, depending on the degree of amplitude. The explanation thereof will be described later.

Figure 4:
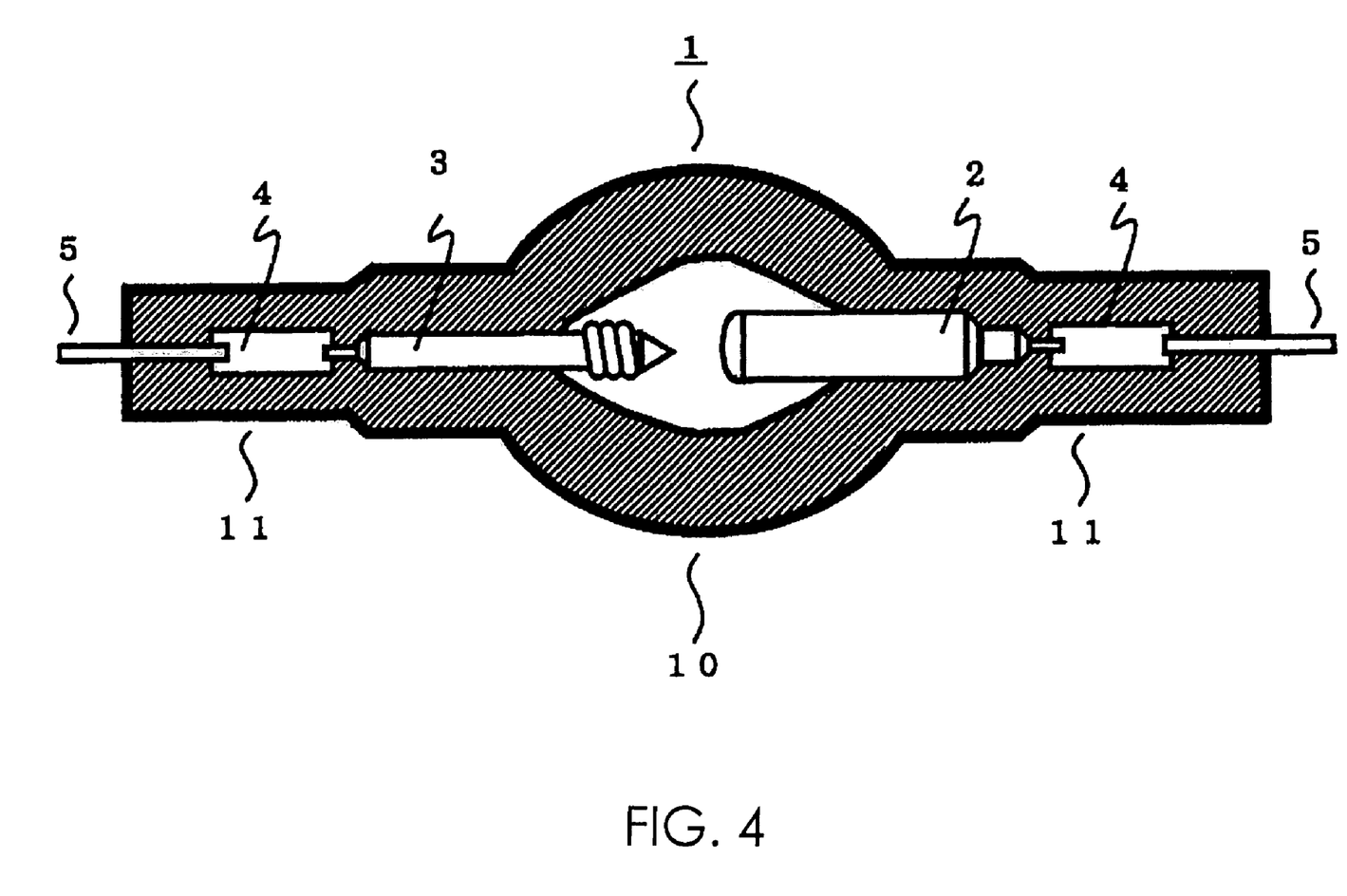
FIG. 4 shows a discharge lamp according to the present invention.

FIG. 4 is an overview of the high pressure discharge lamp (also hereinafter referred to as merely "a discharge lamp"). The discharge lamp 1 has an approximately spherical light emitting portion 10 formed as part of a discharge container made of quartz glass, wherein in the light emitting portion 10, an anode 2 and a cathode 3 are disposed facing each other. A sealing portions 11 is formed so as to extend from each end portion of the light emitting portion 10, and in each sealing portion, a metallic foil for conduction 4 usually made of molybdenum is air-tightly buried by, for example, shrink sealing. One end of each metallic foil 4 is connected to the anode 2 or the cathode 3, and the other end of the metallic foil 4 is connected to an external lead 5.

In the light emitting portion 10, mercury, rare gas, and halogen gas is enclosed. The mercury is used in order to obtain radiation of necessary visible light wavelength, for example, 360-780 nm wavelengths, wherein mercury of 0.16 mg/mm$^3$ or more is filled therein. The amount of the filling differs depending on the temperature condition. The vapor pressure is extremely high when it is 150 or more atmospheric pressure at time of lighting.

Moreover, it is possible to make a high mercury vapor pressure discharge lamp whose mercury vapor pressure is 200 or more atmospheric pressure, or 300 or more atmospheric pressure at time of lighting by enclosing much more mercury, so that it is possible to realize a light source suitable for a projector apparatus, as the mercury vapor pressure becomes higher. For rare gas, for example, argon gas of 13 kPa is filled therein so that the lighting initiation property is improved.

The halogen is enclosed in form of compound of iodine, bromine, chlorine etc. and other metals such as silver. The filled amount of halogen is selected from the range of, for example, $10^{-6}$ to $10^{-2}$ μmol/mm$^3$. Although the function of the halogen is to extend the life time of the discharge lamp by using the halogen cycle, in case of an extremely small discharge lamp with high inner pressure, as described above, there is an advantage that devitrification or destruction of the discharge container is prevented by enclosing halogen.

As a numerical example of such a discharge lamp, for example, the outer diameter of the light emitting portion is selected from the range of φ6.0-15.0 mm, such as 9.4 mm, the inner diameter of the light emitting portion is selected from a range of φ3.0-7.0 mm, for example φ4.4 mm, and the distance between the electrodes is selected from a range of 0.5-2.0 mm, for example, 1.0 mm, and the arc tube internal volume is selected from a range of 40-300 mm$^3$, for example, 60 mm$^3$. As the lighting conditions, for example, the tube wall load is selected from a range of 0.8-2.0 W/mm$^2$, such as 1.5 W/mm$^2$, and rated voltage and rated-apparent-power are 75 V and 200 W, respectively. Moreover, such a discharge lamp is built in a projector apparatus etc. to be miniaturized, and while the entire structure is miniaturized extremely, the high intensity light is required.

Therefore, the thermal conditions of the inside of the light emitting portion become very severe. And the discharge lamp is disposed in an apparatus for presentations like a projector apparatus or an overhead projector, in which radiation light with good color rendering nature is provided. Here, although it is not necessarily clear about the reason that a projection is formed at the tip of the anode by superimposing an alternating component on direct current, it may be explained as set forth below. That is, it becomes possible to continuously change a tungsten evaporation area, and a tungsten solidification and deposition area by superimposing an alternating component on direct current thereby changing an area of a contact portion of the arc on the anode tip face. That is, it is believed that when current increases, tungsten (W), tungsten oxide (WOx), tungsten bromide (WBrx), and tungsten bromide oxide (WOxBry) evaporate from a wide area of the tip of the anode, and when a current value decreases, tungsten (W) atoms are solidified and deposited at the arc contact point of the tip of an anode. It is thought that by repeating this phenomenon periodically, the projection is formed in the front face of the anode so that the growth of the arc length can be controlled by monotonically caused wear.

Moreover, in the formation of the projection, it is desirable that the current value of an alternating current component be symmetric in upward and downward directions with respect to direct current which turns into a base value. That is, it means that increasing time of the alternating component current value is equal to decreasing time thereof, and current value difference between the direct current value which turns into the base value and the maximum current value is equal to current value difference between the direct current value which turns into the base value and the minimum current value. Therefore, pulses which are periodically superimposed on direct current which turns into the base current are not enough to form such a projection at the tip of the anode in terms of effects.

Figure 5A:
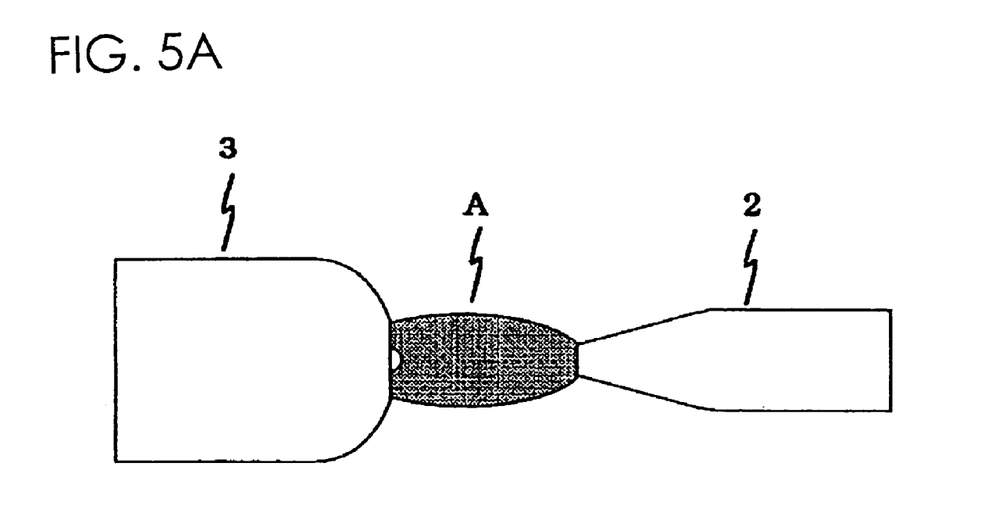
FIGS. 5A and 5B show enlarged views of electrodes according to the present invention is shown.
Figure 5B:
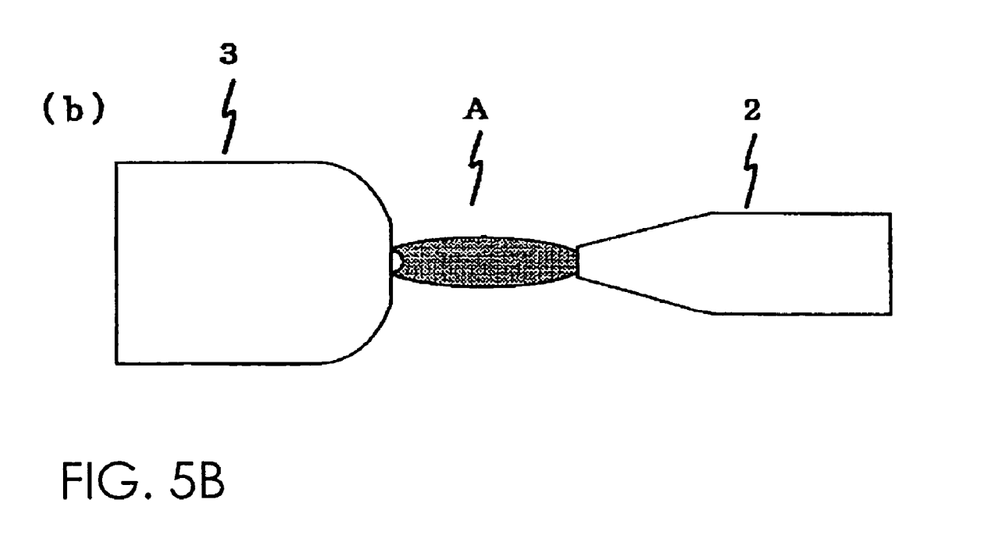
Figure 6:
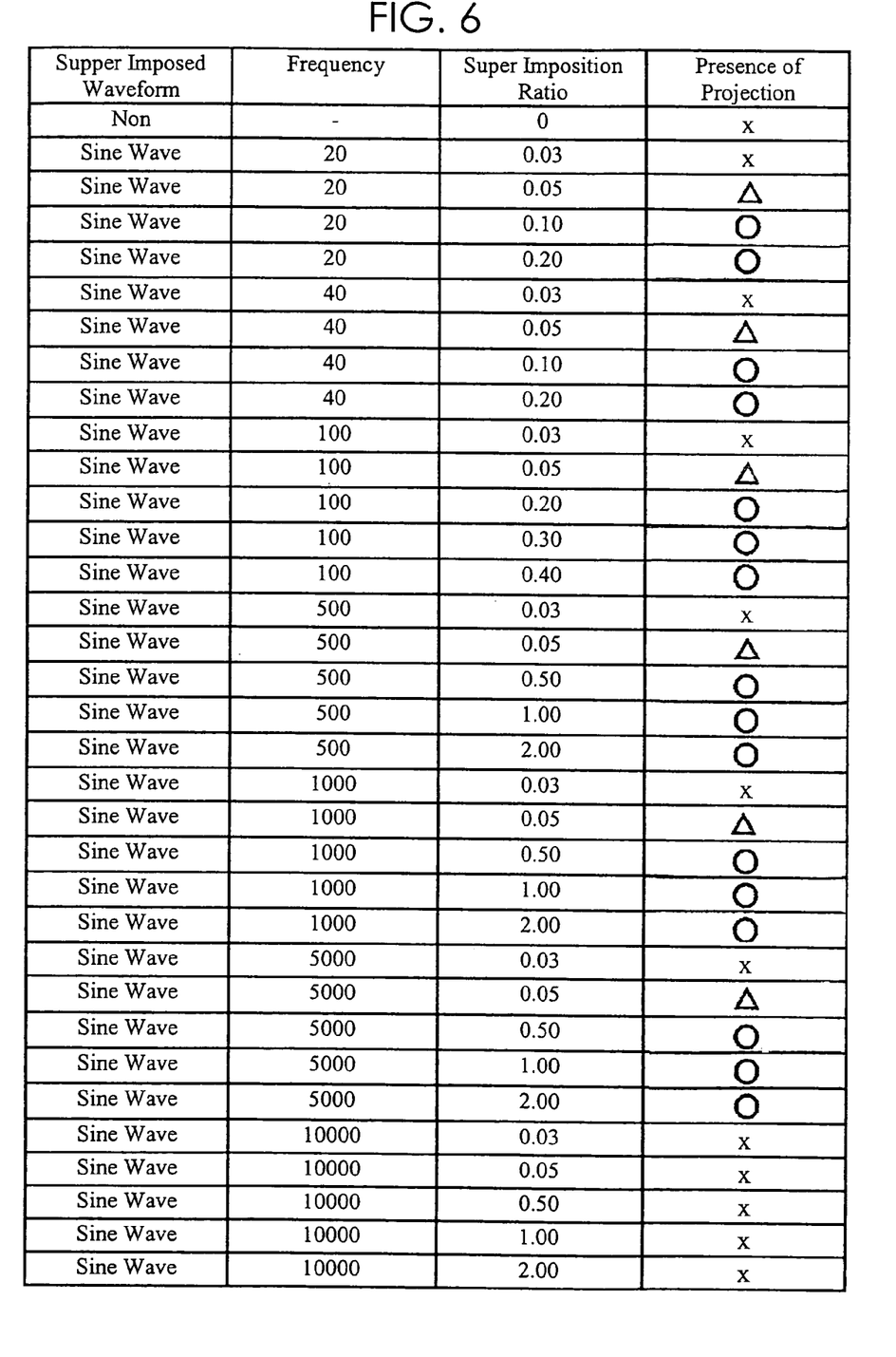
FIG. 6 is a table showing effects of the present invention.

FIGS. 5A and 5B are schematic views showing states of the anode front face and proximity thereof in one cycle of an alternating component. FIG. 5A shows a state where the maximum current is impressed. FIG. 5B shows a state where the minimum current is impressed. In the figure, a discharge arc A is formed between the anode 3 and the cathode 2. As shown in FIG. 5A, in the state where the maximum current is impressed, tungsten (W), tungsten oxide (WOx), tungsten bromide (WBrx), and tungsten bromide oxide (WOxBry) evaporate from a wide range, when the arc is in contact with the wide area of the tip of the anode 3.

On the other hand, in a state shown in FIG. 5B, when a current value decreases, the arc is narrowed so that the contact area with the anode 3 decreases and ionized tungsten is bound with electrons, thereby causing solidification and deposition at the tip of the anode 3 as tungsten (W) atom. By repeating this phenomenon periodically, the projection is formed on the front of the anode so that it is possible to control the growth of the arc length due to monotonous wear of the anode.

Thus, by impressing an alternating current component to the lamp current of a direct current lighting system, a projection can be formed at the tip of the anode by changing an evaporation area and solidification/deposition area in the anode surface.

However, this phenomenon does not necessarily occur in all types of discharge lamp, but it notably occurs in a high pressure mercury lamp, especially, in a discharge lamp in which a pair of electrodes is disposed in an arc tube at an interval of 2 mm or less, so as to face each other, and mercury of 0.16 mg/mm$^3$, rare gas, and halogen in a range of $1 \times 10^6$ to $1 \times 10^{-2}$ μmol/mm$^3$ is enclosed. That is, this phenomenon distinctively occurs in a lamp where mercury density is high, and the arc length is short so that an arc with high current density is formed.

Next, the effects of the high-pressure discharge lamp lighting apparatus according to the present invention are explained. In a discharge lamp which is described in FIG. 4 and description thereof and power supply apparatus shown in FIGS. 1 and 2, lighting conditions were changed.

First, all the direct-current values (IDC) used as a base value was within a range of 2.7 A, and rated lighting electric power of 200 W was applied. Lighting was carried out in eight cases, that is, in cases where the frequency of the alternating current component to be superimposed was 20 Hz, 40 Hz, 100 Hz, 500 Hz, 1000 Hz, 5000 Hz, and 10000 Hz, and in a case where no alternating current component was superimposed.

Moreover, in each frequency, the superposition rate (max−Imin)/IDC was changed in the range of "0.03" to "2.0", so as to observe the existence of a projection.

Consequently, in the case where the alternating current component was not superimposed, and in the case where the frequency of the alternating current component superimposed was 10000 Hz, no projection was formed at the tip of the anode.

Moreover, in cases where the frequencies of the alternating current component were 20 Hz-5000 Hz, when the superposition rate was 0.03 or less, no projection was formed, but when the superposition rate was 0.05, an extremely small projection was formed.

On the other hand, in cases where the super imposition rate was 0.2 to 2.0, a projection was formed well.

In addition, it is found that when an alternating current component was 20 Hz, flickering was large on a screen so that it was not practically used.

Figure 7A:
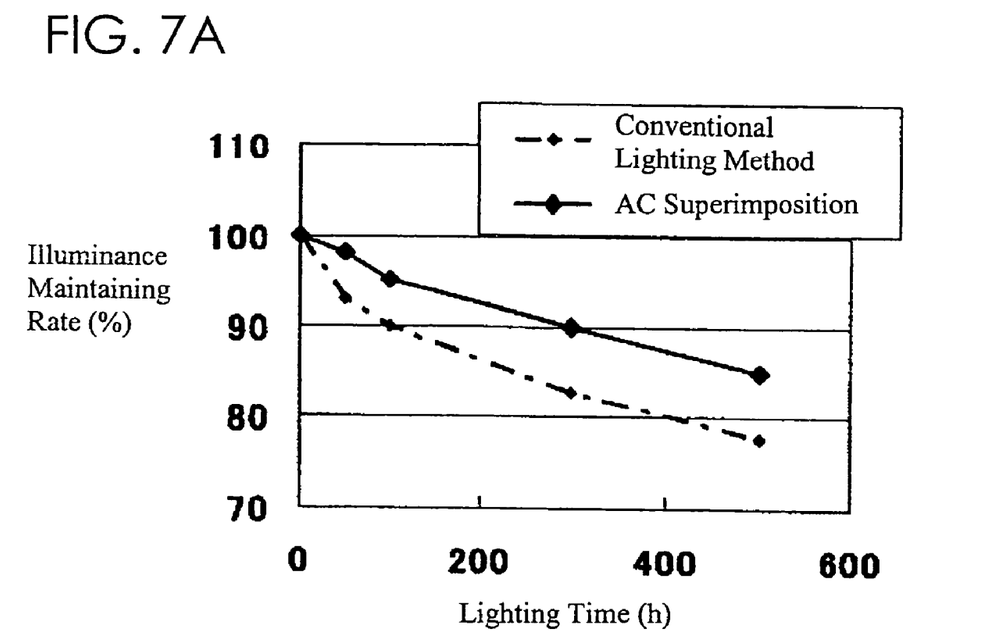
FIGS. 7A and 7B shows graphs showing the effects of the present invention.
Figure 7B:
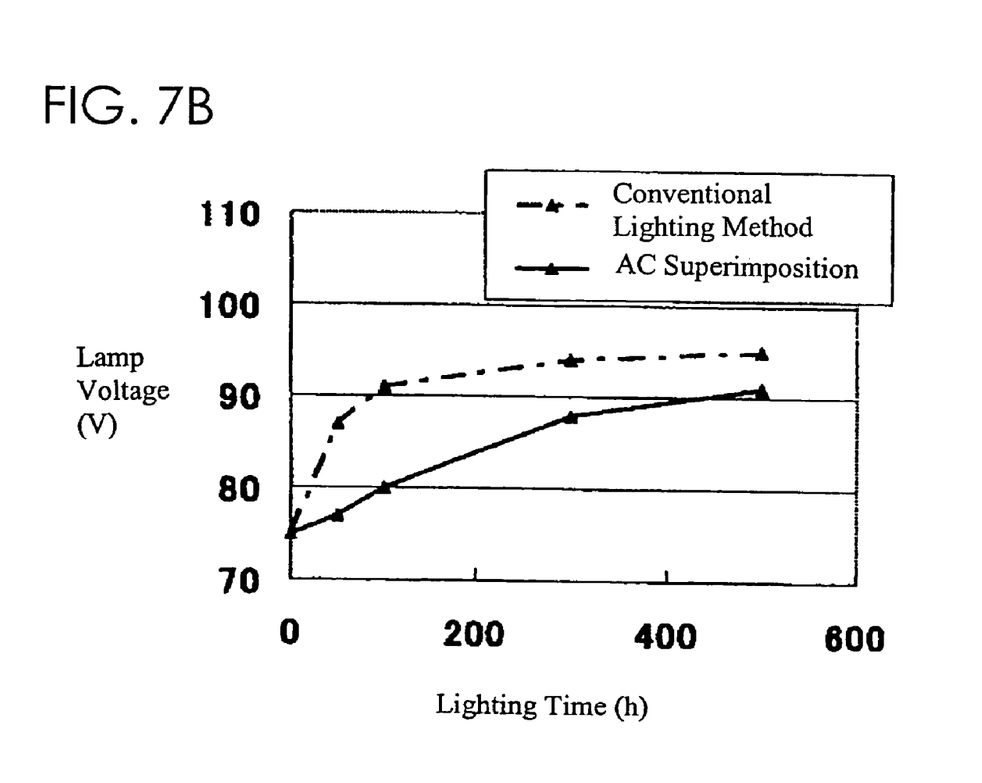

FIGS. 7A and 7B show the difference between the present invention and the conventional technology, wherein FIG. 7A shows a graph of illuminance maintaining rate in 500 hour lighting and FIG. 7B shows a graph of change of lamp voltage in 500 hour lighting in which while in the present invention, the alternating current component was superimposed, in the conventional component, the alternating current component was not superimposed.

In the present invention, an alternating current component with a frequency of 500 Hz and the superimposing rate of 0.4 was superimposed on direct current of 2.7 A which turns into the base value. In the conventional technology, direct current of 2.7 A was applied.

In either case, light was turned on by applying initial rated lighting electric power of 200 W. The initial maintaining rate shows an illuminance on a screen, which is a relative value where the illuminance at early stage of lighting is regarded as 100.

In FIG. 7B, in the conventional lamp, the lamp voltage went up rapidly in 50 hours after the lamp was lighted.

Moreover, it turns out that the lamp voltage exceeded 90 V, in 100 hours after it was turned on, so that it went up by 15 V from the initial voltage (approximately 75 V).

On the other hand, the lamp according to the present invention, the lamp voltage increasing rate was smaller than that of the conventional lamp. This means that in the discharge lamp according to the present invention, a projection was formed at the tip of the anode along with lamp lighting, so that increase of the distance between electrodes was controlled.

Moreover, in FIG. 7A, the illuminance maintaining rate in the lamp according to the present invention, was 95% in 100 hours, 90% in 300 hours, and 85% in 500 hours, while the illuminance maintaining rate in the conventional lamp was 90% in 100 hours, 83% in 300 hours, and 78% in 500 hours, so that effects of maintaining illuminance are shown.

Since the high pressure discharge lamp according to the present invention is used for a projector apparatus so that the light amount of the arc luminescent spot is used, it is shown that decrease of the light amount due to increase of the distance between electrodes is controlled.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A high pressure discharge lamp lighting apparatus having a high pressure discharge lamp in which a pair of electrodes is arranged so as to face each other at an interval of 2 mm or less in an arc tube which is made of quartz glass, and mercury of 0.16 mg/mm$^3$ or more, rare gas, and halogen of $1 \times 10^{-6}$ to $1 \times 10^{-2}$ μmol/mm$^3$ is enclosed, and a power supply apparatus supplying direct current to the discharge lamp, wherein the power supply apparatus superimposes an alternating current component on the direct current and impress the superimposed current to the discharge lamp, wherein a frequency of the alternating current component is 40 to 5000 Hz. and $0.05 \leq (\text{Imax}-\text{Imin})/\text{IDC} \leq 2$ wherein Imax represents a maximum current value of the alternating current component, Imin represents a minimum current value of the alternating current component and IDC represents direct current value.

2. The high pressure discharge lamp lighting apparatus according to claim 1, wherein the frequency is in a range of 100-2000 Hz.

3. The high pressure discharge lamp lighting apparatus according to claim 1, wherein a waveform of an alternating current component is symmetric in upward and downward directions with respect to the direct current which turns into a base value.

4. The high pressure discharge lamp lighting apparatus according to claim 3, the waveform is sine waveform.

5. The high pressure discharge lamp lighting apparatus according to claim 3, the waveform is approximately triangle waveform.

6. A method of forming a projection at a tip of an anode of a high pressure discharge lamp in which a pair of electrodes is arranged so as to face each other in an arc tube, and mercury of 0.16 mg/mm$^3$ or more, rare gas, and halogen of $1\times10^{-6}$ to b $1\times10^{-2}$ μmol/mm$^3$ is enclosed, comprising the following steps of:

superimposing an alternating current component on direct current, and impressing the superimposed current to the discharge lamp, wherein a frequency of the alternating current is 40 to 5000 Hz, and $0.05 \leq (Imax-Imin)/IDC \leq 2$ wherein Imax represents a maximum current value of the alternating current, Imin represents a minimum current value of the alternating current and IDC represents direct current value.

* * * * *